(12) United States Patent
Lerner

(10) Patent No.: US 9,033,115 B2
(45) Date of Patent: May 19, 2015

(54) ZIP LINE BRAKING

(71) Applicant: Shawn Lerner, New York, NY (US)

(72) Inventor: Shawn Lerner, New York, NY (US)

(\*) Notice: Subject to any disclaimer, the term of this patent is extended or adjusted under 35 U.S.C. 154(b) by 183 days.

(21) Appl. No.: 13/673,509

(22) Filed: Nov. 9, 2012

(65) Prior Publication Data

US 2013/0118842 A1    May 16, 2013

Related U.S. Application Data

(60) Provisional application No. 61/558,571, filed on Nov. 11, 2011.

(51) Int. Cl.
| | |
|---|---|
| *B61H 9/02* | (2006.01) |
| *B60T 1/10* | (2006.01) |
| *B61H 9/00* | (2006.01) |
| *B60T 13/58* | (2006.01) |
| *B60T 13/74* | (2006.01) |

(52) U.S. Cl.
CPC ... *B61H 9/02* (2013.01); *B60T 1/10* (2013.01); *B61H 9/00* (2013.01); *B60T 13/586* (2013.01); *B60T 13/748* (2013.01)

(58) Field of Classification Search
CPC .............. B61H 9/00; B61H 9/02; B61B 7/00; B60T 13/586; B60T 13/748
USPC .................... 188/65.1–65.3, 62, 378; 104/113
See application file for complete search history.

(56) References Cited

U.S. PATENT DOCUMENTS 1,859,180 A * 5/1932 Thiel ............................ 104/113

FOREIGN PATENT DOCUMENTS

WO    WO 2009000059 A1 * 12/2008

\* cited by examiner

*Primary Examiner* — Melanie Torres Williams
(74) *Attorney, Agent, or Firm* — Mintz Levin Cohn Ferris Glovsky and Popeo, P.C.

(57) ABSTRACT

For zip line braking, a brake cable travels between at least two terminals. A brake applies a braking force to travel of the brake cable. A link arm is in physical communication with the brake cable. A trolley receiver in physical communication with the link arm and slidably traveling along a zip line receives a trolley slidably traveling along the zip line. The trolley receiver transfers the braking force through the link arm to the trolley.

13 Claims, 5 Drawing Sheets

ZIP LINE BRAKING

This application claims priority to U.S. Provisional Patent Application No. 61/558,571 entitled "ZIP LINE BRAKING" and filed on Nov. 11, 2011 for Shawn Lerner, which is incorporated herein by reference

BACKGROUND

1. Field

The subject matter disclosed herein relates to braking and more particularly relates to zip line braking.

2. Description of the Related Art

Zip lines transport a passenger suspended from a trolley down a cable. The zip line must reliably stop the passenger and trolley at the end of the cable.

BRIEF SUMMARY

An apparatus is disclosed for zip line braking. A brake cable travels between at least two terminals. A brake applies a braking force to travel of the brake cable. A link arm is in physical communication with the brake cable. A trolley receiver in physical communication with the link arm and slidably traveling along a zip line receives a trolley slidably traveling along the zip line. The trolley receiver transfers the braking force through the link arm to the trolley. A method performing the functions of the apparatus is also disclosed.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Descriptions of Figures may refer to elements described in previous Figures, like numbers referring to like elements.

Figure 1:
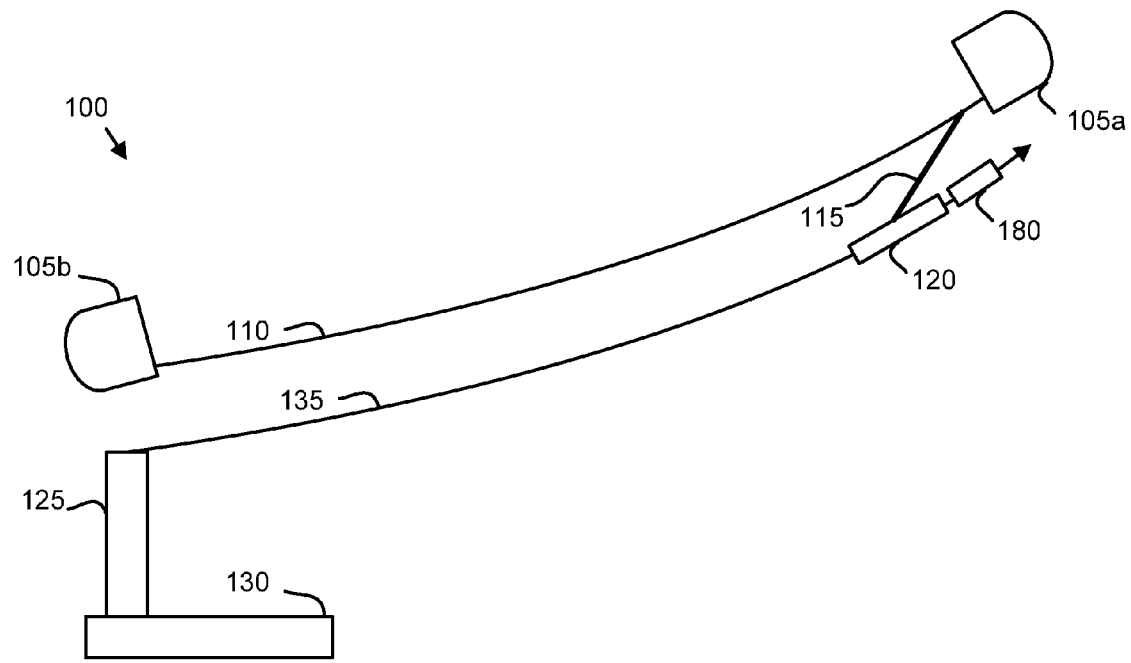
FIG. 1 is a schematic block diagram illustrating one embodiment of a zip line brake.

FIG. 1 is a schematic block diagram illustrating one embodiment of a zip line brake 100. The brake 100 includes a zip line 135, a brake cable 110, a link arm 115, a trolley receiver 120, two or more terminals 105, a tower 125, a trolley 180, and a platform 130.

The zip line 135 may carry passengers from starting point (not shown) to a platform 130 at an end point. The starting point may be on a structure, a building, a mountain, or the like. The tower 125 may secure the zip line 135 near the platform 130. Another tower (not shown) may secure the zip line 135 at the starting point.

The passenger (not shown) may be suspended from the trolley 180 that slidably travels along the zip line 135. The trolley 180 may employ one or more grooved wheels to travel along the zip line 135. The trolley 180 and passenger may attain significant speeds while traveling along the zip line 135. As a result, it is often necessary to significantly slow the trolley 180 and passenger before the trolley 180 and passenger reach the platform 130.

However, slowing the trolley 180 and passenger throughout the descent on the zip line 135 may significantly diminish the thrill of the ride. If the passenger and/or an automatic braking system on the trolley 180 is relied upon to brake the trolley 180 as the trolley 180 nears the platform 130, the passenger and/or automatic braking system may fail to brake properly, resulting in an accident.

The embodiments described herein may brake trolley 180 and a passenger descending on a zip line 135 automatically, without intervention by the passenger, an operator, and/or braking devices on the trolley 180. The trolley receiver 120 slidably travels on the zip line 135. The receiver trolley 120 may travel along the zip line 135 on one or more grooved wheels. The trolley receiver 120 may receive the trolley 180 as the trolley 180 approaches the platform 130. The trolley receiver 120 may receive the trolley 180 by physically contacting the trolley 180 as the trolley 180 descends the zip line 135.

The trolley receiver 120 is in physical communication with the link arm 115. The link arm 115 is in physical communication with the brake cable 110. As the trolley receiver 120 receives the trolley 180, momentum of the trolley 180 and the passenger are transferred to the trolley receiver 120. In addition, the momentum is transferred through the link arm 115 to the brake cable 110, motivating the brake cable 110 to travel between the terminals 105.

The brake cable 110 may be spooled on a pulley, spool, or drum in each of the terminals 105. The brake cable 110 may be restrained by the brake that will be described hereafter. The brake restrains the brake cable 110, and through the link arm 115 and the receiver 120 also restrains the trolley 180. As a result, the trolley 180 may be quickly, safely, and reliably slowed to affect a safe landing at the platform 130.

Figure 2:
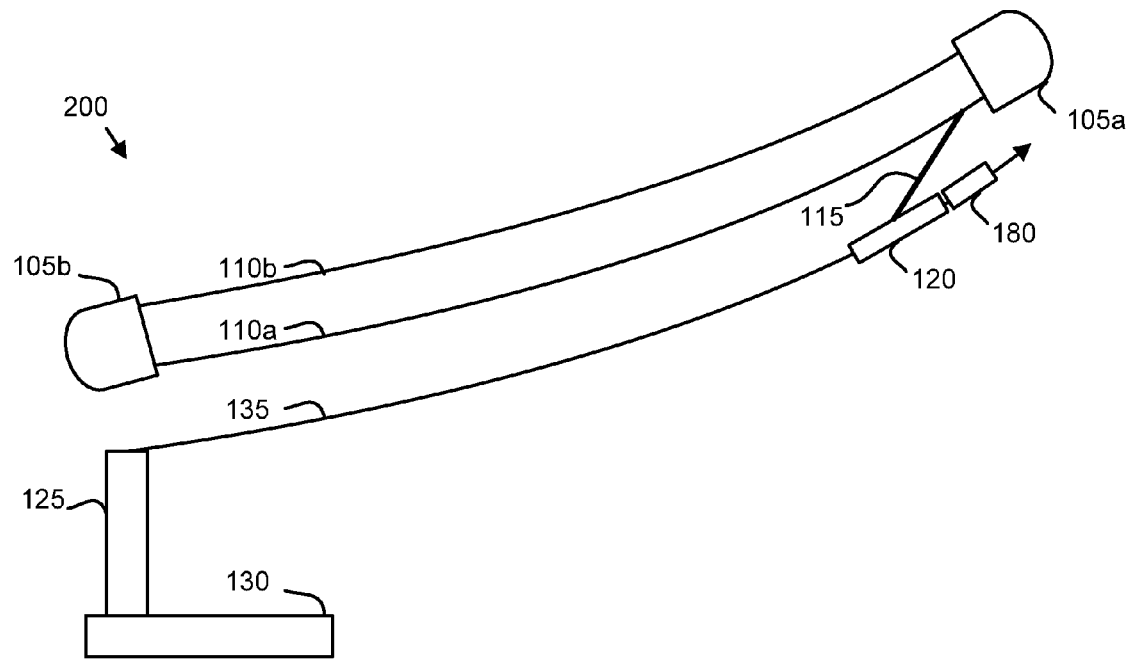
FIG. 2 is a schematic block diagram illustrating one alternate embodiment of a zip line brake.

FIG. 2 is a schematic block diagram illustrating one embodiment of a zip line brake 200. The brake 200 is an alternate embodiment of the brake 100 of FIG. 1. The brake cable 110 is a continuous loop, with the first brake cable section 110a traveling opposite the second brake cable section 110b. The brake cable 110 may travel over a pulley in each of the terminals 105 as will be described hereafter. The brake may restrain the looped brake cable 110, braking the trolley through the trolley receiver 120 and linking arm 115.

Figure 3:
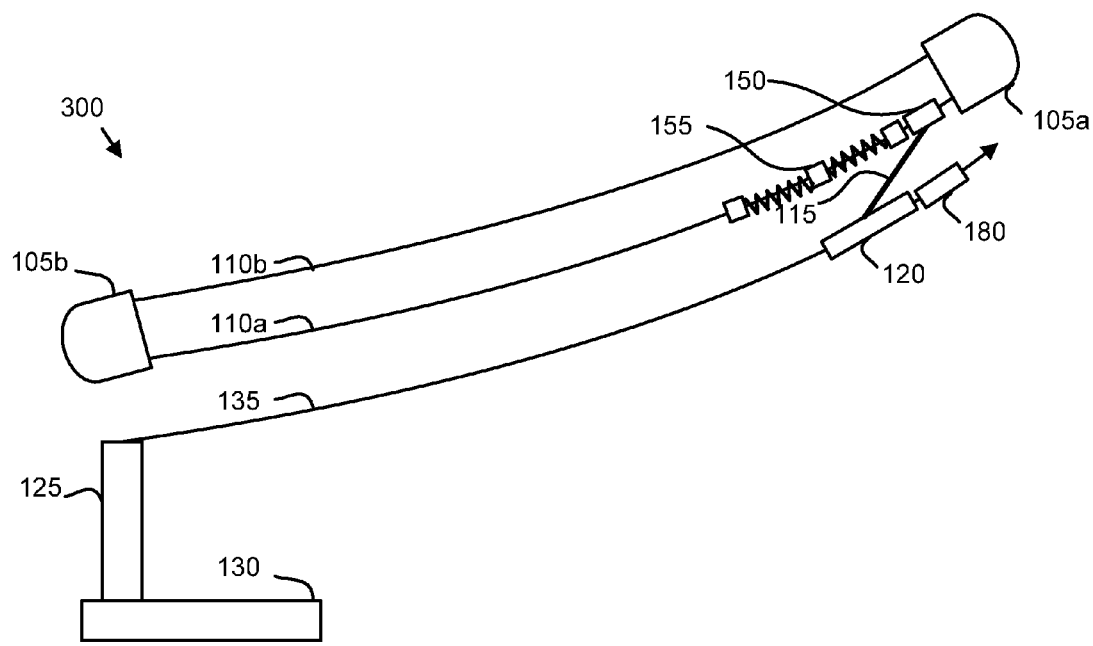
FIG. 3 is a schematic block diagram illustrating one embodiment of a zip line brake.

FIG. 3 is a schematic block diagram illustrating one embodiment of a zip line brake 300. The brake 300 is an alternate embodiment of the brake 200 of FIG. 2. The brake 300 includes a brake receiver 150 and a spring 155. The brake receiver 150 may be affixed to the brake cable 110. The brake receiver 150 may allow the link arm 115 to be connected to and disconnected from the brake cable 110.

The spring 155 may be affixed to the brake cable 110. The spring 155 may slidably travel over the brake cable 110. Alternatively, the spring 155 may be physically connected to the brake receiver 150. The spring 155 may absorb momentum of the brake receiver 150 when the spring 155 is in physical communication with the lower receiver 105b and the brake receiver 150 compresses the spring 155.

Figure 4:
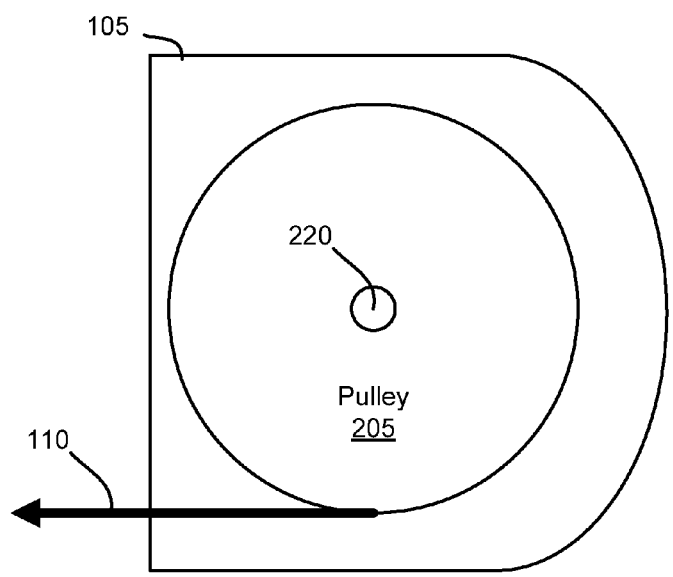
FIG. 4 is a schematic block diagram illustrating one embodiment of a terminal.

FIG. 4 is a schematic block diagram illustrating one embodiment of a terminal 105. The terminal 105 may be an upper terminal 105a of FIG. 1. Alternatively, the terminal 105 may be the lower terminal 105b of FIG. 1.

The brake cable 110 may be spooled on a pulley 205. Alternatively, the brake cable 110 may be spooled on a drum and/or spool. The pulley 205 is supported by the shaft 220. In one embodiment, the pulley 205 is in physical communication with a motor that will be shown hereafter. The motor may drive the pulley 205 to move the brake cable 110 to an initial position to receive the trolley 180. Alternatively, the pulley 205 may be in physical communication with the brake. The brake may apply a braking force to travel of the brake cable 110.

For example, the motor may drive the pulley 205 to move the brake cable 110 to the initial position. The initial position may be adjacent the upper terminal 105a. The trolley receiver 120 may then receive the trolley 180, motivating the brake cable through the linking arm 115. The brake may apply to braking force to slow the brake cable 110. The braking force may be sufficient to reduce the motion of the trolley 180 to a minimum speed when the trolley 180 arrives at the platform 130.

Figure 5:
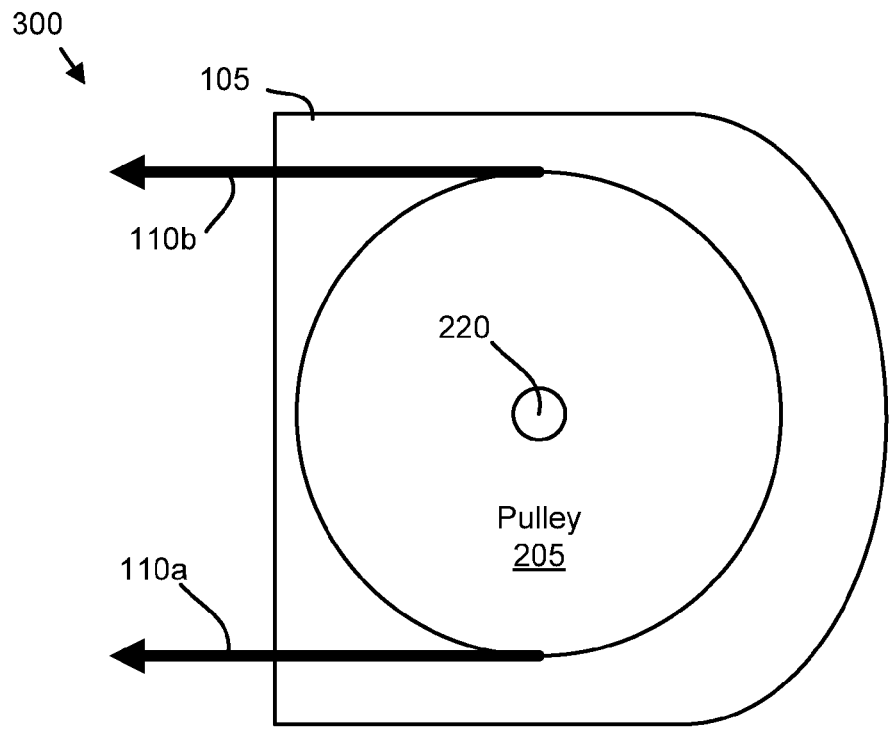
FIG. 5 is a schematic block diagram illustrating one alternate embodiment of a terminal.

FIG. 5 is a schematic block diagram illustrating one alternate embodiment of a terminal 105. The terminal 105 may be the upper terminals 105a of FIGS. 2-3. Alternatively, the terminal 105 may be the lower terminals 105b of FIGS. 2-3. The looped brake cable 110 travels around the pulley 205. The pulley 205 is supported by the shaft 220. In one embodiment, the pulley 205 is in physical communication with a motor that will be shown hereafter. The motor may drive the pulley 205 to move the brake cable 110 to an initial position to receive the trolley 180. Alternatively, the pulley 205 may be in physical communication with the brake. The brake may apply a braking force to travel of the brake cable 110.

Figure 6:
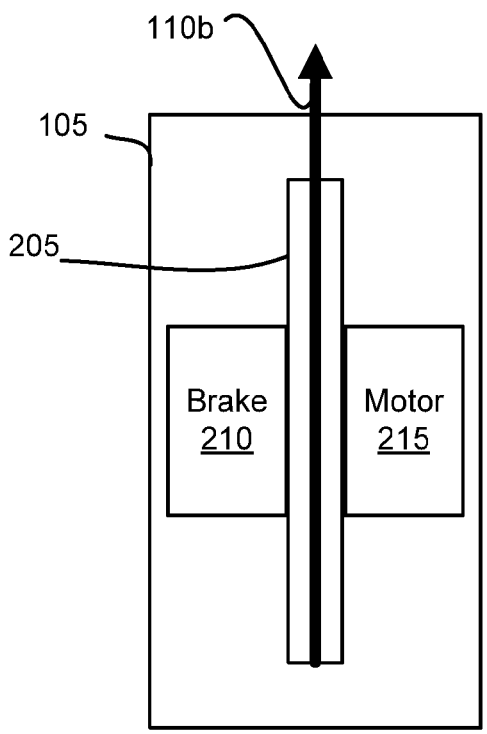
FIG. 6 is a top-view schematic drawing of one embodiment of a terminal.

FIG. 6 is a top-view schematic drawing of one embodiment of a terminal 105. The terminal 105 may be the terminals of FIGS. 1-5. The pulley 205 is depicted in physical communication with a brake 210 and a motor 215. In alternate embodiment, the brake 210 resides in the lower terminal 105b and the motor 215 resides in the upper terminal 105a. In a certain embodiment, the brake 210 resides in the upper terminal 105a and the motor 215 resides in the lower terminal 105b.

In one embodiment, the brake 210 is an eddy current brake. The eddy current brake may also function as the motor 215. The eddy current brake may apply an increasing braking force as the speed of the brake cable 110 increases. Thus the eddy current brake may reliably bring the trolley 180 to a stop at the platform 130 for passengers with different masses.

In an alternate embodiment, the brake 210 is a regenerative brake. The regenerative brake may also function as the motor 215. In a certain embodiment, the brake 110 is a friction brake.

Figure 7:
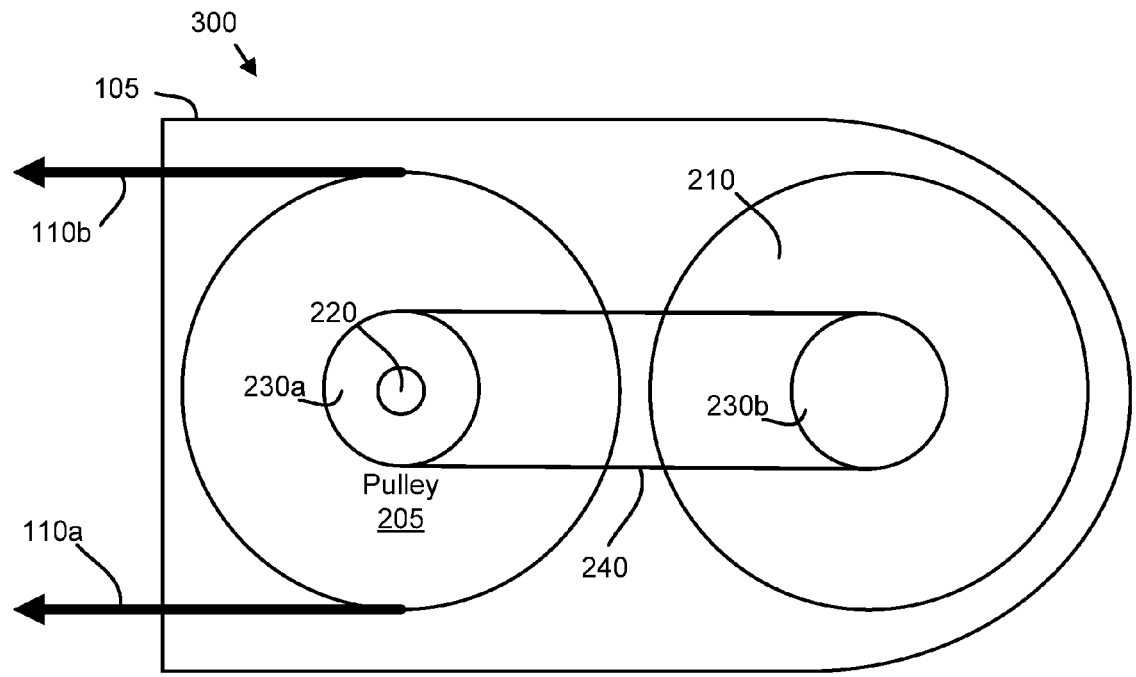
FIG. 7 is a schematic block diagram illustrating one embodiment of a terminal with brake.

FIG. 7 is a schematic block diagram illustrating one embodiment of a terminal 105 with brake 210. The terminal 105 may be the terminal 105 of FIGS. 2, 3, 5, and 6. The brake 210 is disposed adjacent the pulley 205. Sprockets 230 may drive a chain 240. The chain 240 may transfer the braking force from the brake 210 to the pulley 205.

Figure 8:
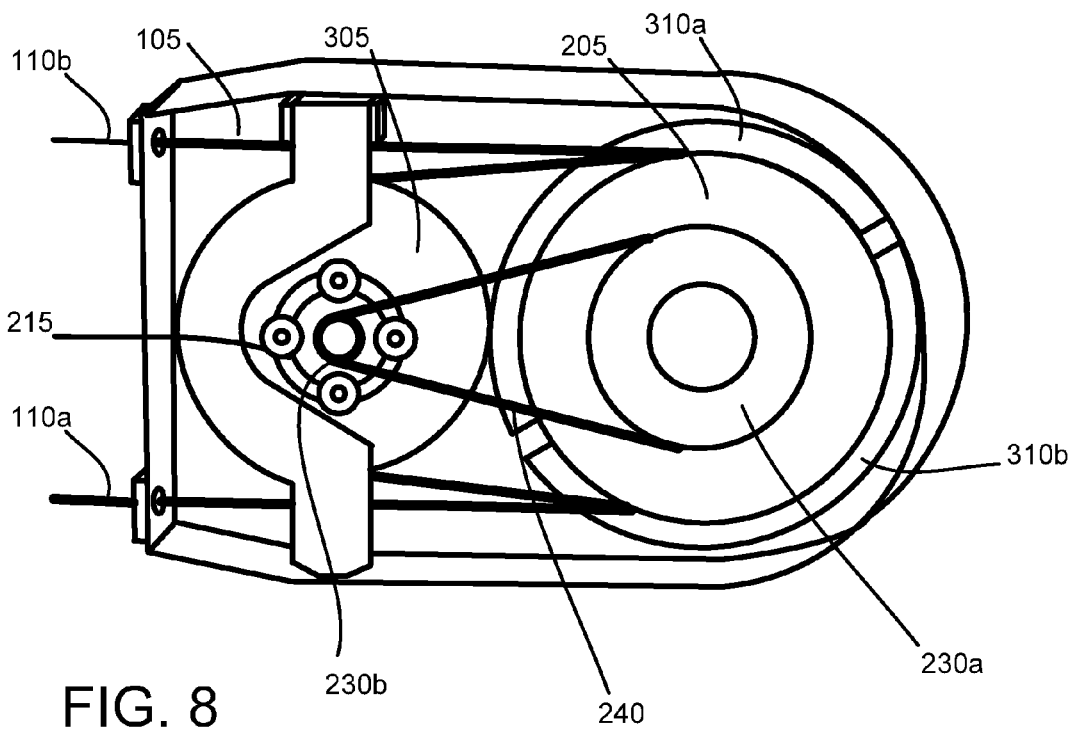
FIG. 8 is a schematic block diagram illustrating one alternate embodiment of a terminal with brake.

FIG. 8 is a schematic block diagram illustrating one alternate embodiment of a terminal 105 with brake. The terminal 105 may be the terminal 105 of FIGS. 2, 3, and 5-7. The brake cable 110 loops around the pulley 205 and an idler 305 as shown. The idler 305 may maintain tension in the brake cable 110. The pulley 205 is connected to the motor 215 by the sprockets 230 and the chain 240. The motor 215 may drive the pulley 205. In addition, the motor 215 may function as a regenerative brake.

The pulley 205 may be formed of a non-ferromagnetic metal. Magnets 310 may induce eddy currents in the pulley 205. The magnets 310 may include a north pole magnet 310a with a north pole oriented toward the pulley 205 and a south pole magnet 310b with a south pole oriented toward the pulley 205. One of skill in the art will recognize the multiple pairs of magnets 310 may be employed. The magnets 310 and pulley 205 may function as an eddy current brake, with the magnets 310 generating eddy currents in the pulley 205 that resist an angular motion of the pulley 205.

Figure 9:
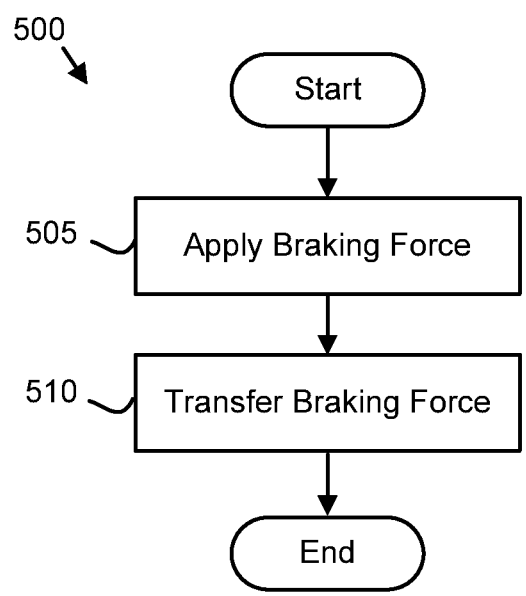
FIG. 9 is a schematic flow chart diagram illustrating one embodiment of a braking method.

FIG. 9 is a schematic flow chart diagram illustrating one embodiment of a braking method 500. The method 500 starts and a brake 210 applies 505 a braking force to travel of a brake cable 110 traveling between at least two terminals 105. A trolley receiver 120 transfers 510 the braking force through a linking arm 115 to a trolley 180 and the method 500 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus comprising:
    a brake cable traveling alongside a portion of a zip line between a first terminal arranged downstream from a starting point of the zip line and a second terminal downstream from the first terminal;
a brake applying a braking force to travel of the brake cable;
a link arm in physical communication with the brake cable; and
a trolley receiver in physical communication with the link arm, slidably traveling along the zip line, the trolley receiver being configured to receive near the first terminal a travelling trolley slidable along the zip line, the trolley receiver transferring the braking force through the link arm to the trolley.

2. The apparatus of claim 1, wherein the brake cable is a loop.

3. The apparatus of claim 1, wherein the brake cable is wound on a spool.

4. The apparatus of claim 1, further comprising a pulley, the brake cable traveling over the pulley.

5. The apparatus of claim 4, wherein the brake applies the braking force to the pulley.

6. The apparatus of claim 4, further comprising a motor driving the pulley to move the brake cable to an initial position.

7. The apparatus of claim 4, wherein the pulley comprises a rubberized groove between two flanges.

8. The apparatus of claim 1, further comprising a brake receiver in physical communication with the brake cable and connecting the linking arm to the brake cable.

9. The apparatus of claim 8, further comprising a spring traveling along the brake cable between the brake receiver and the second terminal.

10. The apparatus of claim 1, wherein the brake is an eddy current brake.

11. The apparatus of claim 10, wherein an eddy current brake moves the brake cable to an initial position.

12. The apparatus of claim 1, wherein the brake is a regenerative brake.

13. The apparatus of claim 1, wherein the brake is a friction brake.

* * * * *